United States Patent [19]
Dodt et al.

[11] Patent Number: 5,463,519
[45] Date of Patent: Oct. 31, 1995

[54] APPARATUS FOR CLEANING A TAPE PATH IN A TAPE DRIVE

[75] Inventors: William C. Dodt, Broomfield; Robert D. Stroud, Boulder, both of Colo.

[73] Assignee: Storage Technology Corporation, Louisville, Colo.

[21] Appl. No.: 227,442

[22] Filed: Apr. 14, 1994

[51] Int. Cl.$^6$ ..................................................... G11B 5/10
[52] U.S. Cl. ............................................................. 360/128
[58] Field of Search ........................ 360/128; 369/71–72

[56] References Cited

U.S. PATENT DOCUMENTS

| | | | |
|---|---|---|---|
| 3,931,643 | 1/1976 | Kuroe | 360/128 |
| 4,616,284 | 10/1986 | Fritsch | 360/128 |
| 4,984,120 | 1/1991 | Satoh | 360/128 |
| 5,047,887 | 9/1991 | Boshek | 360/128 |

FOREIGN PATENT DOCUMENTS 5-12630  1/1993  Japan ...................................... 360/128

*Primary Examiner*—A. J. Heinz
*Attorney, Agent, or Firm*—Duft, Graziano & Forest

[57] ABSTRACT

The cleaning tape comprises a substrate on which is overlaid a coating that provides a mechanical abrading surface to clean the elements in the tape path, such as the read/write heads. The coating has a high coefficient of friction to remove and retain the residues that have accumulated on the read/write heads. The coating is impregnated with or encloses a cleaning solvent that is controllably released by the mechanical movement of the cleaning tape over the read/write heads. The cleaning solvent can be isopropyl alcohol or other solvents that are encapsulated in some manner in the cleaning tape. As the solvent is released on to the read/write heads, it chemically loosens the debris which the abrasive coating can then mechanically remove from the read/write heads and also retain on the abrasive coating.

11 Claims, 2 Drawing Sheets

APPARATUS FOR CLEANING A TAPE PATH IN A TAPE DRIVE

FIELD OF THE INVENTION

This invention relates to tape drives and, in particular, to apparatus used to clean the elements that comprise a tape path in a tape drive, especially the read/write heads contained therein.

PROBLEM

It is a problem in the field of data storage and retrieval to provide a simple, inexpensive and effective method and apparatus that can be used to clean debris that have accumulated in the apparatus that is used to store and retrieve the data on a data storage media. In the field of tape drives, the debris that accumulates on the read/write heads can introduce errors in the data that is stored on the data storage media. One type of tape drive is the helical scan tape drive that makes use of a rotary head that contains a plurality of read/write heads. The magnetic tape data storage media is wrapped around a segment of the rotary head to come in contact with the rotating read/write heads. The data is written on to the magnetic tape in stripes diagonally across the magnetic tape and the plurality of read/write heads are sequentially activated to provide a single read/write head in contact with the magnetic tape at all times.

One form of helical scan tape drive is the video tape drive that uses a two reel magnetic tape cassette as the data storage element that houses the data storage media. In the video tape technology, cleaning tapes are used to clean debris from the read/write heads. These cleaning tapes are formed of a substrate on which is deposited a somewhat abrasive cleaning material to scrape the accumulated debris from the read/write heads. This apparatus removes loose debris solely using mechanical techniques. A problem with these cleaning tapes is that they are only partially effective in removing debris from the read/write heads. This lack of complete effectiveness does not represent a significant problem in the video tape environment since errors in the video data are either recoverable or they do not compromise the data transfer to the user. In particular, the presence of errors, even of significant frequency of occurrence, does not impair the data content of the stored video data since the degradation of a number of pixels in a frame of video data is typically not noticeable by the user and does not interfere with the user's perception of the data.

In the use of helical scan technology for storage of computer data, errors, even infrequent in occurrence, represent a significant problem. The loss of a single bit of computer data can be of significant import and each error must be recovered from in a manner that ensures error-free data storage and retrieval. The existing helical scan tape drives that are used for storage and retrieval of computer data make use of a single reel magnetic tape cartridge to house the magnetic tape media. This media format uses a leader block attached to one end of the magnetic tape to enable the tape drive to extract the magnetic tape from the magnetic tape cartridge. There is no cleaning tape implemented in this media format and existing cleaning tapes in dual reel cassettes for helical scan technology are not effective in adequately cleaning the read/write heads. Therefore, helical scan tape drives used in both video and computer data storage and retrieval must be periodically removed from service, disassembled, cleaned by a craftsperson, then reassembled. This process is expensive, time consuming and is itself sometimes not effective in removing sufficient accumulated debris.

SOLUTION

The above described problems are solved and a technical advance achieved in the field by the apparatus of the present invention that comprises a cleaning tape, implemented in a single reel tape cartridge, that provides a dispensable solvent to chemically loosen the accumulated debris and a cleaning surface to abrade the debris from the tape path without damaging or changing the contours of the read/write heads. The helical scan tape drives used to store and retrieve computer data require frequent cleaning to ensure accurate data storage and retrieval. The debris that accumulates is tenacious in that it accumulates quickly and is difficult to reliably remove.

The apparatus of the present invention is a cleaning tape that can be mounted as needed in the tape drive to remove accumulated debris on a periodic basis before significant accumulations occur. The cleaning tape comprises a substrate on which is overlaid a coating that provides a mechanical abrading surface to clean the elements in the tape path, such as the read/write heads without damaging or changing the contours of the read/write heads. The coating has a high coefficient of friction to remove and retain the residues that have accumulated on the read/write heads. The coating is impregnated with or encloses a cleaning solvent that is controllably released by the mechanical movement of the cleaning tape over the read/write heads. The cleaning solvent can be isopropyl alcohol or other solvents that are encapsulated in some manner in the cleaning tape. As the solvent is released on to the read/write heads, it chemically and physically loosens the debris which the abrasive coating can then mechanically remove from the read/write heads and also retain on the abrasive coating.

DETAILED DESCRIPTION

Figure 1:
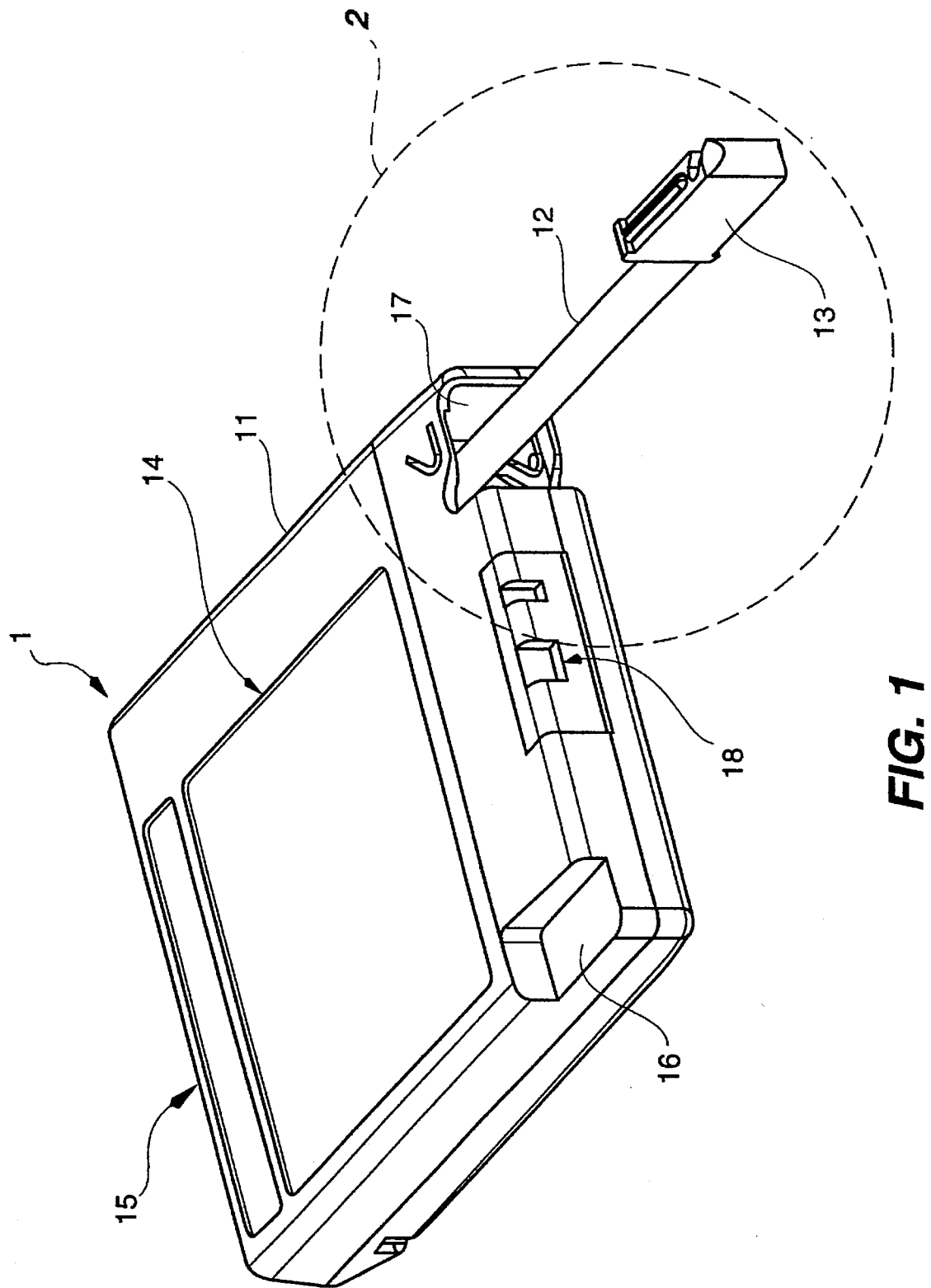
FIG. 1 illustrates in perspective view the cleaning tape of the present invention as embodied in a single reel tape cartridge.

FIG. 1 illustrates in perspective view the cleaning tape of the present invention as embodied in a single reel tape cartridge. The use of a single reel tape cartridge is simply for the purpose of illustration of the invention and the cleaning tape can also be implemented in a two reel tape cassette, or single unenclosed tape reel, or any other tape format that is desired.

The tape cartridge 1 comprises an exterior housing 11 of predetermined format and dimensions that substantially correspond to the magnetic tape cartridge used to house the magnetic tape media on which is written the computer data. The cartridge 1 is a mountable media element that can be loaded into the tape drive as needed to clean the elements in the tape path. The exterior housing 11 has a top side 14 and a rear side 15. Included in exterior housing 11 is an orientation notch 16 that enables the tape drive to determine whether the tape cartridge 1 is loaded therein in the proper orientation. Media identification notches 18 are also optionally provided on the front side 18 of exterior housing to enable the tape drive to automatically identify the contents of tape cartridge 1. An opening 17 is provided in the front side 18 to enable access to the cleaning tape 12 that is wound on the single reel 19 that is rotatably mounted within exterior housing 11. The area enclosed in the dotted line A is illustrated in additional detail in FIG. 2. The cleaning tape 12 includes a leader block 13 attached to one end thereof, which leader block 13 corresponds to the leader block on the magnetic tape cartridge that is used to store data. When the cleaning tape cartridge 1 is mounted in the tape drive (not shown), the cleaning tape 12 is withdrawn from the tape cartridge 1 by a tape threading arm in the tape drive retrieving leader block 13. The tape threading arm transports leader block 13 and the attached cleaning tape 12 through the tape path where it is threaded on to a take up reel located in the tape drive. The tape drive then transports the cleaning tape 12 from the tape cartridge 1 to the take up reel where it is wound thereon. The mechanical movement of the cleaning tape 12 across the elements of the tape path clean the read/write heads of the tape drive as described herein.

Cleaning Tape Architecture

Figure 2:
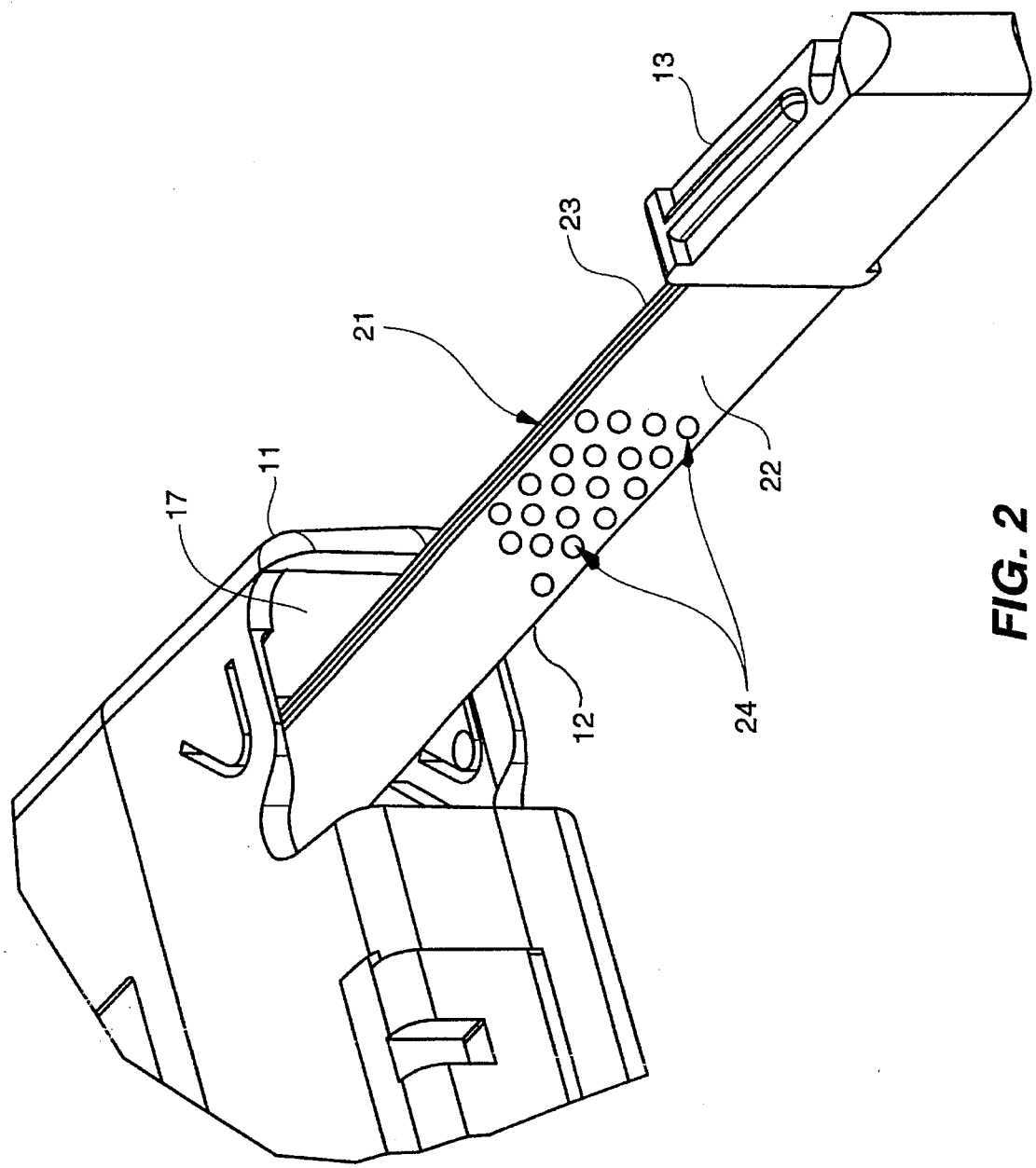
FIG. 2 illustrates in cross section view an embodiment of the cleaning tape of the present invention.

The cleaning tape 12 illustrated in FIG. 2 in detail comprises a substrate 21 on which is overlaid a coating 22, 23 that provides a mechanical abrading surface to clean the elements in the tape path, such as the read/write heads. The coating 22, 23 is applied along the length of substrate 21 and on at least one side thereof. The coating 22, 23 has a high coefficient of friction to remove and retain the residues that have accumulated on the read/write heads. The coating 22, 23 is impregnated with or encloses a liquid cleaning agent 24 that is controllably released by the mechanical movement of the cleaning tape 12 over the read/write heads. The cleaning agent 24 can be a cleaning solvent, such as isopropyl alcohol or other solvents that are encapsulated in some manner in the cleaning tape 12. As the cleaning solvent 24 is released on to the read/write heads and other elements in the tape path, it chemically loosens the debris which the abrasive coating 22, 23 can then mechanically remove from the read/write heads and also retain on the abrasive coating 22, 23 for removal from the tape drive. The cleaning tape 12 can be used numerous times to clean the read/write heads before the cleaning agent 24 is expended and the coating 22, 23 is filled with the removed debris.

One embodiment of the cleaning tape 12 comprises a substrate 21 that comprises a pliable yet rugged material of dimensions that substantially correspond to the magnetic tape which is typically used in this tape cartridge 1. For example, the substrate 21 material can be a weaved filament Nylon, woven in a perpendicular weave, typically having a thread count of 114 threads per square centimeter. The minimum warp is typically 66 ends per centimeter and the typical fill is 44 picks per centimeter. The physical dimensions of the cleaning tape 12 are typically given as nominal length, width and thickness. A typical thickness of the substrate material is 0.099 millimeters and of width 12.7 millimeters, while the length is 14.0 meters. The coating 22, 23 on this cleaning tape 12 is formulated to have a relatively high coefficient of friction. The coating 22, 23 can be cured by temperature treatment, and a cured coating 22, 23 is more effective in cleaning the read/write head surfaces, without imparting significant wear on either the read/write heads or the coating 22, 23 itself.

There are several techniques that can be used to encapsulate a cleaning agent 24 in the cleaning tape 12. The coating 22, 23 can be formulated to cure at room temperature or at an elevated temperature and the cleaning solvents 24 can be selected such that the volatility of the cleaning solvent 24 ensures their compatibility with the coating 22, 23 and its manufacturing process. There are advantages to a coating 22, 23 which cures at room temperature and the cured coating 22, 23 tends to retain the less volatile solvents. The typical solvent that is used to clean read/write heads is isopropyl alcohol which tends to dissipate rapidly. The isopropyl alcohol actually loosens the debris rather than dissolving the debris, which facilitates the mechanical removal of the accumulated debris. Less volatile solvents such as cellosolve acetate or cyclohexanone are also effective in chemically loosening accumulated debris from the read/write heads.

Cleaning Tape Coating Architectures

There are a plurality of implementations of the cleaning tape 12 that can be used to provide a carrier for the cleaning agents and provide the abrasive surface. Several implementations are listed herein but there are other alternative structures that can be used for the identical purpose. Additionally, the cleaning solvents 24 listed herein are simply illustrative of the concepts of the invention and there are other cleaning agents that can be used in lieu of those listed herein. The coating that is applied to the substrate is most likely polyurethene, but it can be any tough flexible polymer, such as epoxy, polyester. The polyurethene material is preferred because of high abrasion resistance. The coating impregnates the substrate, and if the substrate is nylon, the coating can chemically bond to the surface.

The coating 22, 23 applied to the substrate 21 can be implemented using soft fibers that are saturated with a cleaning solvent 24 that is added to the soft fibers and which cures at room temperature. The cleaning action of the soft fibers is enhanced by the cleaning solvent 24, without causing significant wear on the read/write head surfaces that come in contact with the cleaning tape 12. For a soft fiber coating 22, 23, cleaning solvents 24 having a low volatility are compatible selections and examples of these cleaning solvents 24 are esters or ketones. The cured coated cleaning tape 12 can be heated to an elevated temperature which creates voids and exit paths in the soft fiber coating 22, 23. The resultant cleaning tape 12 is immersed in a selected cleaning solvent 24 to impregnate the coating 22, 23 with a cleaning solvent 24. A cleaning solvent 24, such as isopropyl alcohol, can be used and the cured cleaning tape 12, when immersed in the cleaning solvent 12, can be subjected to elevated pressure to accelerate reabsorption of the cleaning solvent 24 in the soft fiber coating 22, 23 of the cleaning tape 12. The cleaning solvent 24 is absorbed by the soft fibers and fills the voids created by the curing process where it is retained until released by the mechanical pressure applied to the coating 22, 23 by the mechanical motion of the cleaning tape 12 over the read/write head surfaces. The soft fibers therefore act as a reservoir for cleaning solvent 24 retention.

An alternative structure for the cleaning tape 12 is the use of a pre-saturated highly absorptive filler material, such as cellulosic or plastic, that is combined with a coating material to produce a resultant coating 22, 23 that is cured at room temperature. This structure is cured at room temperature, followed by an elevated temperature bake to create voids and exit paths. The coated cleaning tape 12 is then immersed in a cleaning solvent 24 to cause absorption of cleaning solvent 24 in the filler material. The filler retains the cleaning solvent 24, which is then released from the coating 22, 23 as the cleaning tape 12 is passed over the read/write heads.

The coating material can also be filled with small beads of encapsulated cleaning solvent 24, which rupture during the elevated bake process that creates the voids and exit paths. Again, the cleaning tape 12 is immersed in the cleaning solvent 24 to cause absorption of the cleaning solvent 24 into the coating 22, 23. The small beads can be implemented by phenolic microballoons, or latex elastomeric microballoons, or carbon microballoons, or thermoplastic microballoons. The thin shells of the beads or microballoons that are ruptured are retained by the coating 22, 23 material. The coating 22, 23 material can be implemented by using a polyurethene resin matrix or other material that enables the cleaning solvent 24 to be released as the cleaning tape 12 comes into contact with the read/write heads. Furthermore, the performance of the polyurethene resin matrix can be enhanced by conversion of this material into a sponge or coarse foam structure by the incorporation of a blowing agent into the coating 22, 23 material. The type of blowing agent and its concentration in the coating 22, 23 is selected to create a selected porosity in the coating 22, 23. In addition, the blowing agents decompose at a specific temperature during the curing process and thereby create gases for expansion. An alternative to the use of a high temperature curing process is the use of room temperature curing, which retains the low volatility cleaning solvents 24.

While a specific embodiment of the invention is disclosed herein, it is expected that alternate embodiments can be devised which utilize the concepts of the invention and which fall within the scope of the claims appended hereto. The specific embodiment disclosed herein is for illustrative purposes and is not intended to limit the invention in any manner.

We claim:

1. A cleaning tape for use in a tape drive to remove debris from elements in the tape path of the tape drive comprising:

a substrate, having a length and a width;

a cleaning agent in liquid form for chemically cleaning said debris from said elements when applied thereto; and a coating applied to said substrate along its length, for substantially permanently storing said cleaning agent prior to insertion of said cleaning tape into a tape drive and substantially uniformly along substantially the entirety of said length of said substrate, wherein said coating is comprised of a porous material to controllably release said permanently stored cleaning agent from any point along said length of said coating upon the application of pressure to said coating at said point by said elements in said tape path when said cleaning tape is inserted into said tape drive.

2. The cleaning tape of claim 1 wherein said substrate comprises a nylon material.

3. The cleaning tape of claim 1 wherein said cleaning agent comprises a cleaning solvent selected from the group of elements including: isopropyl alcohol, cellosolve acetate, cyclohexanone, esters and ketones.

4. The cleaning tape of claim 1 wherein said coating comprises:

fibrous material configured to include voids and exit paths therein.

5. The cleaning tape of claim 4 wherein said fibrous material comprises a material selected from the group of elements including:

cellulosic and plastic.

6. The cleaning tape of claim 1 wherein said coating comprises:

a layer of polyurethene resin matrix applied to one major surface of said substrate.

7. The cleaning tape of claim 6 further comprising:

a plurality of beads, each of which encloses a portion of said cleaning agent, said beads rupturable by application of pressure to said beads.

8. The cleaning tape of claim 7 wherein said beads are combined with said layer of polyurethene resin matrix.

9. The cleaning tape of claim 1 further comprising:

a reel on which said cleaning tape is wound.

10. The cleaning tape of claim 9 further comprising:

housing means for enclosing said reel and said cleaning tape wound thereon.

11. The cleaning tape of claim 10 further comprising:

leader block means affixed to a first end of said cleaning tape for enabling a tape drive to extract said cleaning tape from said housing means when said housing means is mounted in said tape drive.

\* \* \* \* \*